(No Model.)

E. HILSHER.
KITCHEN UTENSIL.

No. 508,711. Patented Nov. 14, 1893.

Witnesses

Inventor
Ellen Hilsher
by Mason Fenwick Lawrence
her Attorneys

UNITED STATES PATENT OFFICE.

ELLEN HILSHER, OF PENFIELD, PENNSYLVANIA.

KITCHEN UTENSIL.

SPECIFICATION forming part of Letters Patent No. 508,711, dated November 14, 1893.

Application filed August 3, 1893. Serial No. 482,298. (No model.)

*To all whom it may concern:*

Be it known that I, ELLEN HILSHER, a citizen of the United States, residing at Penfield, in the county of Clearfield and State of Pennsylvania, have invented certain new and useful Improvements in Kitchen Utensils; and I do hereby declare the following to be a full, clear, and exact description of the invention, such as will enable others skilled in the art to which it appertains to make and use the same.

My invention relates to a device for freshening salt fish and meats and for draining the same after being freshened and it consists of a light, open wire work frame having downwardly extending supporting legs provided with hooking ends and an upwardly extending bail or handle for handling and suspending the device, as will be hereinafter described and claimed.

Figure 1:
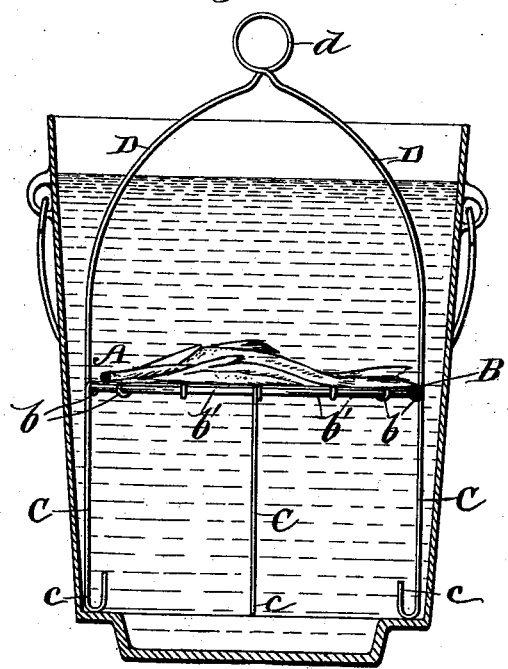
Figure 2:
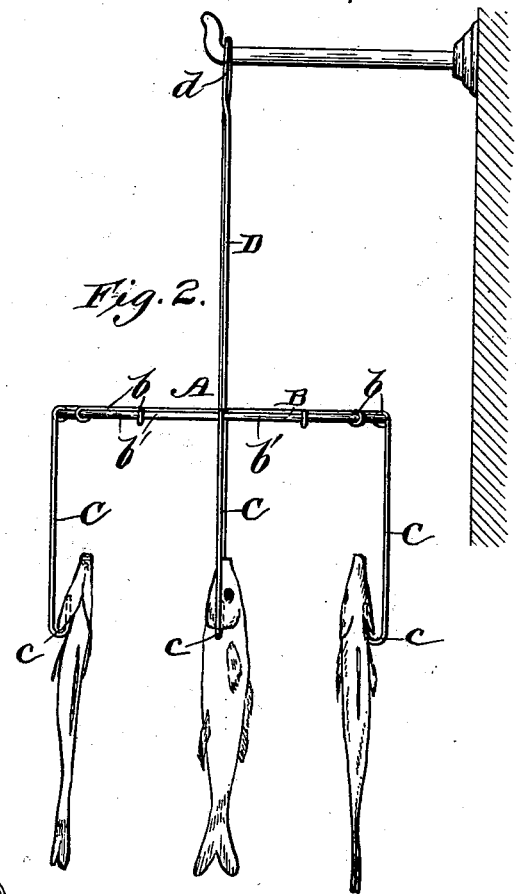
Figure 3:
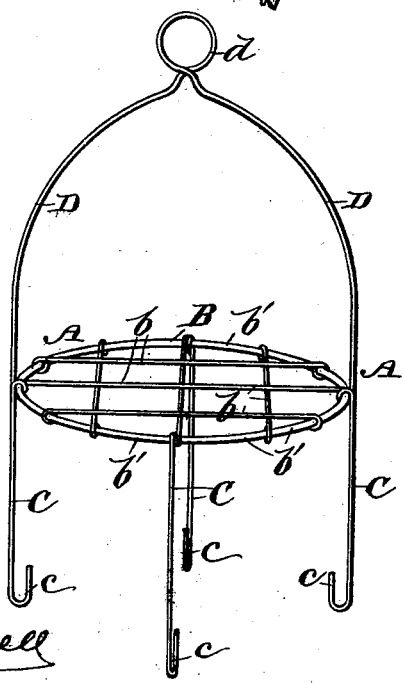

In the accompanying drawings, Figure 1. is a vertical section of a cooking utensil with my invention applied in the same. Fig. 2. is a side elevation of the device removed from the cooking utensil and suspended from a suitable hook, and Fig. 3. is a detail perspective view of the device.

A in the drawings represents my improved kitchen utensil which is designed to be placed in a kettle or pot filled with water so that the water will completely cover the central open wire work frame and any article placed upon the same to be freshened, as shown in Fig. 1.

This kitchen utensil consists of an intermediate open wire work supporting frame B preferably of circular form, downwardly pendent supporting legs C turned upward at their lower ends to form hooks c, and an upwardly extending bail or handle D provided with a suspending ring d as shown.

The pendent supporting legs C not only serve to hold the intermediate supporting frame at the desired distance from the bottom of the kettle so that water can surround the fish or meat placed on the same, on all sides, but also provide a means for suspending the fish or meat after it has been properly soaked, for the purpose of thoroughly drying the same.

Heretofore in soaking salt fish and meat it has been customary to place the same in a kettle of water, the fish or meat during the soaking operation resting on the bottom of the kettle, by which means the water is prevented from completely surrounding the fish or meat and the salt is held in between the fish and bottom of the kettle by reason of which the fish or meat is frequently improperly soaked or requires a long time and often a change of water in order to thoroughly accomplish the removal of the salt. By the use of my utensil the soaking operation can be much more thoroughly and quickly accomplished. By constructing the supporting frame of spaced wires b practically the whole of the fish is exposed to the action of the water and I consider this construction superior to a perforated metal plate.

The utensil being made of wire is very light and cheap and can be made with a small number of pieces which facilitates its manufacture.

The operation of using my invention is as follows: Fish for instance are placed on the open wire work supporting frame and the utensil lowered by means of the handle or bail into a kettle filled with water so that the water surrounds the fish on all sides, and after being properly soaked the utensil is removed by means of the handle and the fish taken from the supporting frame and hung up on the hooks c., and the utensil suspended upon a suitable support by means of the eye of the bail as shown in Fig. 2.

From the foregoing it will be seen that to place the fish and remove the same from the water it is not necessary to insert the hands into the kettle and also that my utensil is not used for cooking purposes but is simply employed for the purposes set forth.

What I claim is—

1. An improved article of manufacture, to wit: a kitchen utensil for soaking and draining salt fish and meats which comprises in its construction a horizontal unobstructed, continuous, open work supporting platform, downwardly pendent legs having upturned open looped, penetrating hooks at their lower ends for hanging fish upon and an upwardly extending bail connected to the supporting platform at its outer edge, substantially as described.

2. An improved article of manufacture, to wit: a kitchen utensil for soaking and draining salt fish and meats, comprising in its construction, a horizontal unobstructed continuous, open wire work supporting platform, downwardly extending legs connected to the platform at its outer edge and provided at their lower ends with upturned, open looped penetrating hooks for hanging fish upon, and a bail provided with a suspending eye, substantially as described.

In testimony whereof I affix my signature in presence of two witnesses.

ELLEN HILSHER.

Witnesses:
F. R. SCOFIELD,
A. H. ROSENKRAUS.